March 13, 1956  J. W. DYER  2,737,792
FRICTION COUPLING

Filed May 25, 1953  2 Sheets-Sheet 1

INVENTOR.
JOHN W. DYER
BY
HIS ATTORNEY

March 13, 1956  J. W. DYER  2,737,792
FRICTION COUPLING
Filed May 25, 1953  2 Sheets-Sheet 2
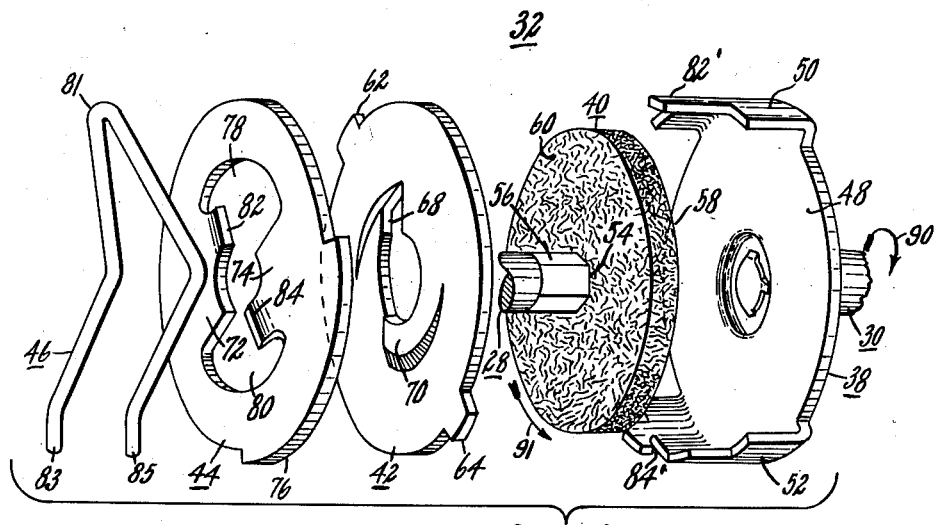
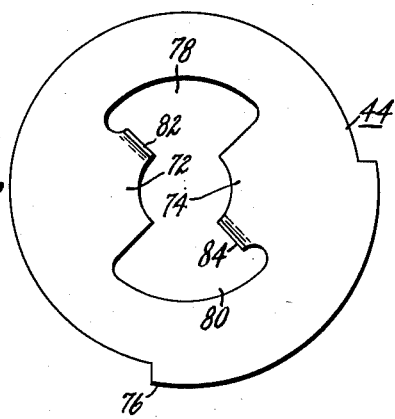 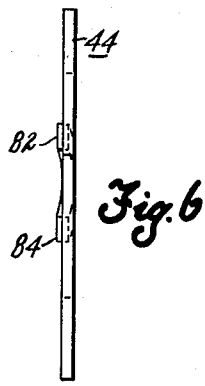
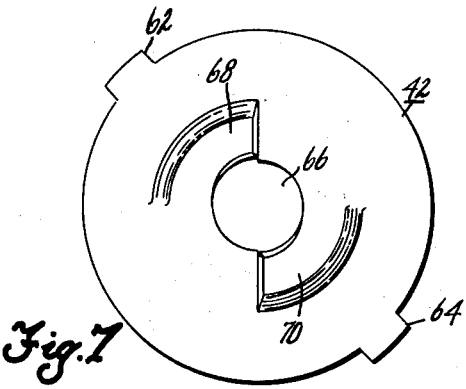 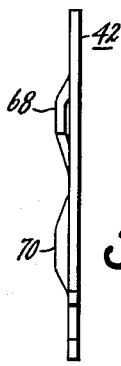
INVENTOR.
JOHN W. DYER
BY
HIS ATTORNEY ns patent

United States Patent Office 2,737,792
Patented Mar. 13, 1956

2,737,792
FRICTION COUPLING

John W. Dyer, Pendleton, Ind., assignor to General Motors Corporation, Detroit, Mich., a corporation of Delaware Application May 25, 1953, Serial No. 357,133

1 Claim. (Cl. 64—30)

This invention relates to friction couplings and is more particularly concerned with a torque transmitting device that is adapted to connect a rotating driving element with a rotatable driven element.

In the modern automobile a provision is frequently made so the driver may control the raising or lowering of the various windows of the vehicle from a control located near the driver's seat. To accomplish this result various mechanisms such as hydraulic actuators and motors, electric motors, etc., frequently provide the necessary torque for actuating the window mechanism. While this type of device adds much to the enjoyment and comfort of the vehicle, it is apparent that the driver when paying close attention to the control of the vehicle may be unaware of the position of the other occupants of the vehicle, and may decide to raise a window when an arm of one of the occupants is in the line of travel of the windowpane and thereby injure a hand or arm of a passenger as well as damage the window raising mechanism of the automobile.

It is therefore, an object of the present invention to provide a window regulator actuating mechanism that is adapted to positively transmit the rotation of a motor to the window actuator mechanism for lowering the window when the motor is rotating in one direction and to provide a slipping connection between the motor and mechanism when the motor operates in the other direction and the window is impeded in its closing.

It is another object of the present invention to provide a friction coupling between a rotating driving element and a rotatable driven element for use in a window raising and lowering mechanism wherein said coupling includes a means for forming a nonslipping connection between the driving and driven element when the driving element rotates in one direction for lowering the window and for changing the nonslipping connection to a slipping connection when the driving element rotates in the opposite direction and a predetermined force is applied against the rotation of the driven element when the window is impeded from closing.

It is a further object of the present invention to provide a frictional coupling for use with a window regulator which provides for transmitting torque between a rotatable motor and a window actuating mechanism so the window may be lowered when the motor rotates in one direction as a predetermined pressure forces elements of the friction coupling in frictional engagement with each other; and when the direction of rotation of the motor is reversed and the closing of the window is impeded by a predetermined force, a lesser pressure is applied between the elements of the friction coupling so a slipping connection is formed therebetween and the movement of the window toward the closed position ceases.

In carrying out the above objects it is another object to provide a friction coupling between a driving and driven member, that has elements thereof in frictional engagement with each other under a predetermined pressure that may be varied. Said predetermined pressure caused by a spring under tension is transmitted through a pair of axially aligned plates to said elements in frictional engagement when plates are axially spaced and in one angular position relative to each other, is reduced when the plates are in a second rotatable position relative to each other and are axially moved together so surface portions thereof contact to form a slipping connection between the driving and the driven element.

Further objects and advantages of the present invention will be apparent from the following description, reference being had to the accompanying drawings wherein a preferred embodiment of the present invention is clearly shown.

In the drawings:

Fig. 4 is an expanded view in perspective of the various elements of the friction coupling in Fig. 3.

Fig. 5 is a plan view of a cam plate shown as 4—4 in Fig. 4.

Fig. 6 is a side view along lines of the cam plate in Fig. 5.

Fig. 7 is a plan view of a pressure plate 42 as shown in Fig. 4.

Fig. 8 is a side view of the pressure plate in Fig. 7.

Figure 1:
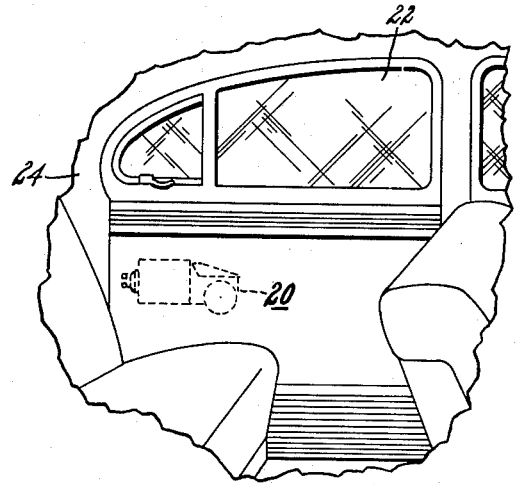
Fig. 1 is a perspective view of a portion of the interior of a vehicle showing the location of a window and a normally concealed torque actuating device therefore.
Figure 2:
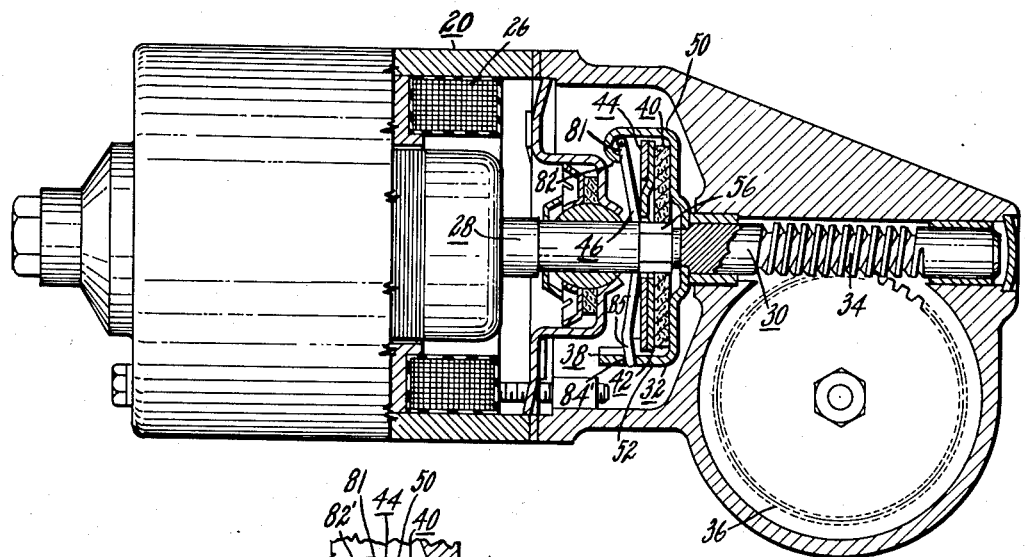
Fig. 2 is a view parallel in section showing a friction coupling as connecting a driving electric motor with a shaft of a worm gear.

In the drawings the numeral 20 is used to designate a window actuator adapted for raising and lowering a window 22 of a vehicle 24. The window actuator 20 may comprise a reversible motor 26, such as an electric motor, a rotatable driving shaft 28, a driven shaft 30, and a friction coupling 32 that transmits the rotation of the driving shaft 28 to driven shaft 30. Shaft 30 is axially aligned with shaft 28 and has a worm gear portion 34 formed thereon that engages gear 36 which actuates a window raising and lowering mechanism, not shown.

The friction coupling 32 shown in expanded form in Fig. 4, includes a driven member 38, a driving member 40, a pressure plate 42, a cam plate 44 and a spring 46 as will be hereinafter described.

The driven member 38 is disc-shaped and secured to driven shaft 30 so as to rotate therewith and has a surface 48 adapted for forming a frictional engagement with a surface 58 of driving member 40 so as to be driven thereby when the surfaces 48 and 58 are held in frictional engagement under a predetermined pressure by spring 46. A pair of lugs 50 and 52 formed on the periphery of disc-like member 38 form a cage-like member therefrom where between the other elements 40, 42, and 44 may be positioned and pressed together by spring 46.

The driving element 40, disc shaped and suitably sized to be received between lugs 50 and 52, has a hexagonal central aperture 54 adapted to engage a hexagonal portion 56 on shaft 28 so that the driving member 40 is rotatable with and axially slidable upon shaft 28. The driving member 40, preferably of a suitable frictional material, has a surface 58 adapted to frictionally engage surface 48 of the rotatable member 38 when sufficient pressure is applied on surface 60 of the driving element 40.

Pressure plate 42, also disc-shaped and axially slidable on shaft 28, has a surface constantly bearing against surface 60 of driving member 40 for applying frictional engaging pressure thereagainst, and has a pair of oppositely disposed lugs 62 and 64 on the periphery thereof that are adapted to engage lugs 50 and 52 of driven member 38 as to provide a limited relative rotation therebetween. A pair of raised wedged-like cam surfaces 68 and 70 formed around the central portion of pressure plate 42 circumscribe a central aperture 66 formed therein. These cam surfaces 68 and 70 are adapted to be received in apertures 78 and 80 of cam plate 44 when cam plate 44 and pressure plate 42 are in one angular position relative to each other and thus permit the plates 42 and 44 to nest with each other. When, however, the pressure plate 42 rotates approximately ¼ turn to cam plate 44, the cam lugs 68 and 70 will ride over raised portions 82 and 84 on to lugs 72 and 74 that are formed on plate 44 adjacent to apertures 78 and 80 and thereby axially force plates 42 and 44 apart against the force exerted by spring 46. Cam plate 44 has a lug 76 sized and located on its peripheral surface arranged to simultaneously engage both lugs 50 and 52 of driven member 38 so as to at all times prevent rotative movement between cam plate 44 and the driven member 38.

Figure 3:
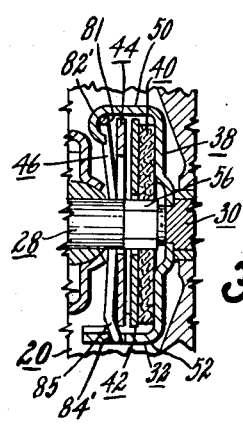
Fig. 3 is a view in section of a friction coupling as in Fig. 2.

The spring 46 is substantially V-shaped and has its apex portion 81 held by a bent-over portion 82' of lug 50 and its prong portions 83 and 85 held in notched portions 84' of lug 52. The mid portion of the spring is inwardly bent and engages surface portions formed by lugs 72 and 74 of cam plate 44 and applies a predetermined pressure between the various elements of the friction coupling 32 when they are in assembled relation as shown in Fig. 3 of the drawings.

From the above it is apparent that cam plate 44 is prevented from rotating with respect to the driven element 38 and pressure plate 42 is limited in its rotation therewith. Thus, when cam plate 44 and pressure plate 42 are in one annular position with respect to each other and to driven element 38, cam lugs 68 and 70 of pressure plate 42 will be received in apertures 78 and 80 of cam plate 44 so that the cam plate 44 and the pressure plate 42 are in nested engagement with one another. When, however the pressure plate 42 rotates approximately 90 degrees with respect to cam plate 44 the cam surfaces 68 and 70 will ride over inclines 82 and 84 and will rest on lugs 72 and 74 so that the two plates are axially separated from each other and thus increase the tension on spring 46. As the tension on spring 46 is increased it correspondingly increases the frictional pressure between the surface 58 of driving member 40 and surface 48 of the driven member 30 so that a nonslipping frictional engagement is formed therebetween so the members will positively rotate with each other.

As shaft rotates driving disc 40 in the direction of arrow 90 so as to lower the window mechanism lugs 62 and 64 will engage lugs 50 and 52 respectively and the cam and pressure plates 44 and 42 will always be axially separated in a manner hereinbefore set forth, so that spring 46 may exert the maximum pressure against the various elements and more particularly between the friction surfaces 58 and 48 so that a tight frictional engagement is positively formed therebetween so that the driving member 40 positively transmits its rotation to driven element 38.

When the direction of rotation is reversed, as shown by arrow 91, and no load is applied on the driven member 38 lugs 62 and 64 will continue to engage lugs 50 and 52 respectively, the positive connection between the driving member 40 and the driven member 38 will continue as set forth above. Should, however, a load be applied aganist the rotation of driven member 38, as for example when arm of the occupant of the vehicle is in the path of the line of travel of the window 22 so as to prevent its closing, then pressure plate 42 will rotate relative to cam plate 44 and nest therewith to thereby decrease the pressure exerting force of spring 46 and correspondingly reduce the frictional pressure between the driving 40 and driven 38 members so a slipping connection is formed therebetween and the upward movement of the window 22 will cease.

The driving member 40 may be made of any suitable friction material providing it has a coefficient of friction greater than that of the driven member 38. These materials comprehend the types used in brake linings, clutches etc., of the nonmetallic, metallic, or porous metal types wherein suitable reinforcing materials may be included or omitted.

While the embodiment of the present invention as herein disclosed, constitutes a preferred form, it is to be understood that other forms might be adopted.

What is claimed is as follows:

A friction torque transmitting coupling comprising a driving member, a coupling disc slidably and non-rotatably mounted on said driving member, a driven disc having axially extending lugs and connected to a driven member, and means biasing the discs into engagement, said biasing means comprising a U-shaped spring, a cam plate and a pressure plate between said spring and said coupling disc, said cam and pressure plates being formed with struck up cam portions to provide cooperating cam surfaces, one of said plate members being non-rotatively connected with said driven disc and the other plate being in frictional contact with said coupling disc and having lugs thereon for engaging the lugs of the driven disc after a limited rotation relative to said driven disc, said cam portions disposed to provide an axial nesting action between said cam surfaces in a central aperture of one of said plates to slippingly relieve normal torque-transmitting cam and spring pressure relationship of the combination upon excessive torque load in only one direction of rotation.

References Cited in the file of this patent
UNITED STATES PATENTS

| | | |
|---|---|---|
| 1,174,920 | Wilson et al. | Mar. 7, 1916 |
| 1,386,272 | Morse | Aug. 2, 1921 |
| 2,151,724 | Mengel et al. | Mar. 28, 1939 |

FOREIGN PATENTS

| | | |
|---|---|---|
| 657,552 | France | 1929 |